(12) United States Patent
Takamori et al.

(10) Patent No.: US 7,502,618 B2
(45) Date of Patent: Mar. 10, 2009

(54) MOBILE TELEPHONE

(76) Inventors: Toshi Takamori, 9-15, Gotenyama 3-chome, Takarazuka-shi, Hyogo 665-0841 (JP); Takashi Fujimoto, 25-25, Midorimachi 6-chome, Kita-ku, Kobe-shi, Hyogo 651-1221 (JP)

( * ) Notice: Subject to any disclaimer, the term of this patent is extended or adjusted under 35 U.S.C. 154(b) by 532 days.

(21) Appl. No.: 10/527,962

(22) PCT Filed: Jun. 2, 2003

(86) PCT No.: PCT/JP03/06971

§ 371 (c)(1), (2), (4) Date: Mar. 15, 2005

(87) PCT Pub. No.: WO2004/027725

PCT Pub. Date: Apr. 1, 2004

(65) Prior Publication Data

US 2006/0166696 A1    Jul. 27, 2006

(30) Foreign Application Priority Data

Sep. 19, 2002  (JP) .............................. 2002-272622

(51) Int. Cl.
  *H04Q 7/20* (2006.01)
(52) U.S. Cl. .............. 455/456.2; 455/456.1; 455/404.2; 455/550.1; 340/539.13; 318/568.12
(58) Field of Classification Search ... 455/404.1–404.2, 455/550.1, 41.2, 456.1–457; 340/539.13, 340/573.1, 692; 370/328, 331–332; 318/568.12, 318/466
See application file for complete search history.

(56) References Cited

U.S. PATENT DOCUMENTS

| 5,446,445 | A | * | 8/1995 | Bloomfield et al. | ......... 340/521 |
| 5,731,785 | A | * | 3/1998 | Lemelson et al. | ...... 342/357.07 |
| 6,044,257 | A | * | 3/2000 | Boling et al. | ............ 455/404.2 |
| 6,236,849 | B1 | * | 5/2001 | Reudink et al. | ............. 455/342 |
| 6,263,208 | B1 | * | 7/2001 | Chang et al. | ............. 455/456.3 |

(Continued)

FOREIGN PATENT DOCUMENTS

JP    6-15014 A    1/1994

(Continued)

*Primary Examiner*—George Eng
*Assistant Examiner*—Kamran Afshar
(74) *Attorney, Agent, or Firm*—Birch, Stewart, Kolasch & Birch, LLP

(57) ABSTRACT

A portable telephone is provided with a first memory 1, a second memory 2, a first CPU 3, a second CPU 4, an interface 5, an antenna 6, a battery 7, and a switch 8. When buildings are collapsed and the user of the portable telephone is left under rubble, a rescuer transmits an emergency signal toward the collapsed site by using a transmission unit. The emergency signal includes key information. The signal is received by the portable telephone and then sent to the first CPU 3 via the antenna 6 and the interface 5. The first CPU 3 compares the key information included in the received signal with key information stored in the first CPU 3. A rescue signal is transmitted via the antenna 6 and the interface 5 on condition that both pieces of key information match. The rescue signal is received by the rescue party and as such, the position of the portable telephone is determined.

2 Claims, 2 Drawing Sheets

U.S. PATENT DOCUMENTS

| | | | |
|---|---|---|---|
| 6,588,701 B2 * | 7/2003 | Yavnai | 244/23 A |
| 6,650,966 B1 * | 11/2003 | Baba et al. | 700/245 |
| 2002/0188522 A1 * | 12/2002 | McCall et al. | 705/26 |
| 2003/0003866 A1 * | 1/2003 | Overy et al. | 455/41 |
| 2003/0125010 A1 * | 7/2003 | Jung | 455/404 |
| 2006/0202801 A1 * | 9/2006 | Ward et al. | 340/10.3 |

FOREIGN PATENT DOCUMENTS

| | | |
|---|---|---|
| JP | 2001-99927 A | 4/2001 |
| JP | 2001-179663 A | 7/2001 |
| JP | 2002-56482 A | 2/2002 |

* cited by examiner

MOBILE TELEPHONE

TECHNICAL FIELD

The present invention relates to mobile telephone apparatuses such as portable telephones, PHS terminals (Personal Handyphone System terminals), compact computers provided with a telephone function, and so on.

BACKGROUND ART

There may be cases where buildings are collapsed by an earthquake, so that people left in the buildings are buried under rubble. Rescue parties remove the rubble to rescue survivors. This operation takes so much time that many people die while waiting for the rescue. It is therefore important to early find out survivors in a disaster.

A robot that moves in rubble to search for survivors with camera images, a carbon dioxide sensor, or an infrared sensor that reacts body heat has been proposed (refer to Nihon Keizai Shimbun, Jul. 14, 2002; p. 28). The robot moves into a place where a rescue party cannot enter (a narrow place, a place filled with poisonous gases, etc.) to find out survivors. The rescue party can locate the position of the robot, or the position of a survivor, by radio waves transmitted by the robot. The use of the robot allows survivors to be rescued by removing local rubble. It is also expected to use the robot for life-sustaining operation including water supply and securing space.

It takes time for the robot to find out survivors by moving in rubble. Accordingly, it is desired to find out survivors earlier in view of increasing a survival rate.

DISCLOSURE OF INVENTION

The present invention is made to use a mobile telephone apparatus for rescue operation. A mobile telephone apparatus according to the invention comprises a storage unit in which key information is stored, a reception unit for receiving an emergency signal including key information, a control unit for determining whether the key information stored in the storage unit and the key information included in the emergency signal match, and a transmission unit for transmitting a rescue signal. The mobile telephone apparatus is configured such that a rescue signal is transmitted from the transmission unit when the key information stored in the storage unit and the key information included in the emergency signal match.

In recent years, mobile telephone apparatuses (typically, portable telephones) have come into widespread use. Moreover, the mobile telephone apparatuses are generally worn by the users or placed close to the users. A rescue party is allowed to locate the position of the mobile telephone apparatus, or the position of the user, by the rescue signal transmitted from the mobile telephone apparatus according to the invention. The mobile telephone apparatus is useful for lifesaving.

Preferably, the storage unit stores individual-identifying information for identifying the user of the mobile telephone apparatus. The individual-identifying information is included in the rescue signal. A person who has received the rescue signal can identify a person who is left in rubble. The identification is useful for treatment after the rescue.

Preferably, the mobile telephone apparatus further includes another control unit for controlling speaking function, a switch, and a battery. The switch can switch on and off of power supply from the battery to the other control unit. Power is supplied from the battery to the control unit that determines whether the key information stored in the storage unit and the key information included in the emergency signal match, irrespective of the switch status. The mobile telephone apparatus can transmit the rescue signal even if the speaking function is in off state.

BEST MODE FOR CARRYING OUT THE INVENTION

The present invention is described in detail below based on embodiments, with reference to the attached drawings.

Figure 1:
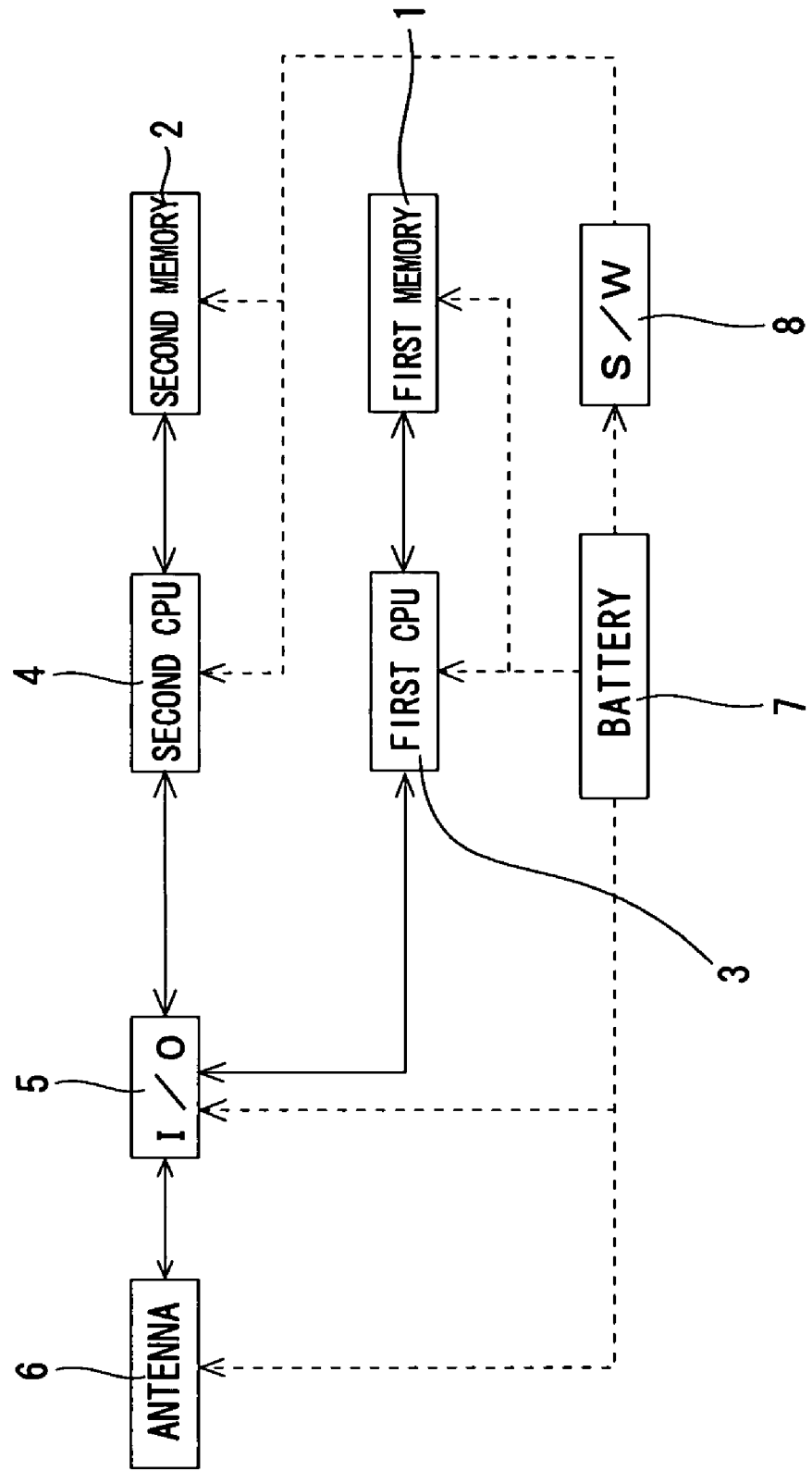
FIG. 1 is a block diagram in which a portable telephone, as a mobile telephone apparatus according to an embodiment of the present invention, is shown.

As shown in FIG. 1, a portable telephone is provided with a first memory 1, a second memory 2, a first CPU 3 serving as a controller, a second CPU 4 serving as another controller, an interface 5, an antenna 6, a battery 7, and a switch 8. The first memory 1 and the second memory 2 construct a storage unit. The interface 5 and the antenna 6 construct a reception unit. The interface 5 and the antenna 6 serve also as a transmission unit. Although not shown, the portable telephone is equipped with an operation input unit including a keypad etc., a microphone, a liquid-crystal display and a speaker.

Each of the first memory 1 and the second memory 2 is a ROM whose contents cannot be overwritten. The first memory 1 stores key information. The key information is stored by a portable telephone company prior to the portable telephone being delivered to the user. The second memory 2 stores a user's telephone number. The telephone number is individual-identifying information. The telephone number is stored by a portable telephone company prior to the portable telephone being delivered to the user. The use of the high-concealment ROMs prevents the leakage of the key information and individual-identifying information.

The solid arrows of FIG. 1 indicate the flow of electric signals. As clearly shown in FIG. 1, the first CPU 3 transmits and receives signals to/from the first memory 1 and also to/from the interface 5. The second CPU 4 transmits and receives signals to/from the second memory 2 and also to/from the interface 5. The interface 5 transmits and receives signals also to/from the antenna 6.

The dotted arrows of FIG. 1 indicate the flow of electricity. The first memory 1, the first CPU 3, the interface 5, and the antenna 6 directly connect to the battery 7. In other words, electricity is applied to the first memory 1, the first CPU 3, the interface 5, and the antenna 6 from the battery 7 irrespective of the state of the switch 8. As long as the battery 7 has power, the first memory 1, the first CPU 3, the interface 5, and the antenna 6 are operable.

The second memory 2 and the second CPU 4 connect to the battery 7 via the switch 8. With the switch 8 in ON state, the second memory 2 and the second CPU 4 are operable. With the switch 8 in OFF state, the second memory 2 and the second CPU 4 are inoperable. In other words, the switch 8 switches on and off of power supply from the battery 7 to the second memory 2 and the second CPU 4. The second CPU 4 controls the functions of a general telephone (speaking function, website viewing function, e-mail transmitting and receiving function, and so on). The second memory 2 provides information necessary for speaking, website viewing, e-mail transmission and reception, etc. to the second CPU 4.

To decrease the current consumption of the battery 7, the user turns off the switch 8. Also when the user is in a hospital, a concert hall, etc., the user sometimes turns off the switch 8 in consideration of minimizing inconvenience to the public. When the switch 8 is in OFF state, the portable telephone does not allow speaking, website viewing, and e-mail transmission and reception.

Figure 2:
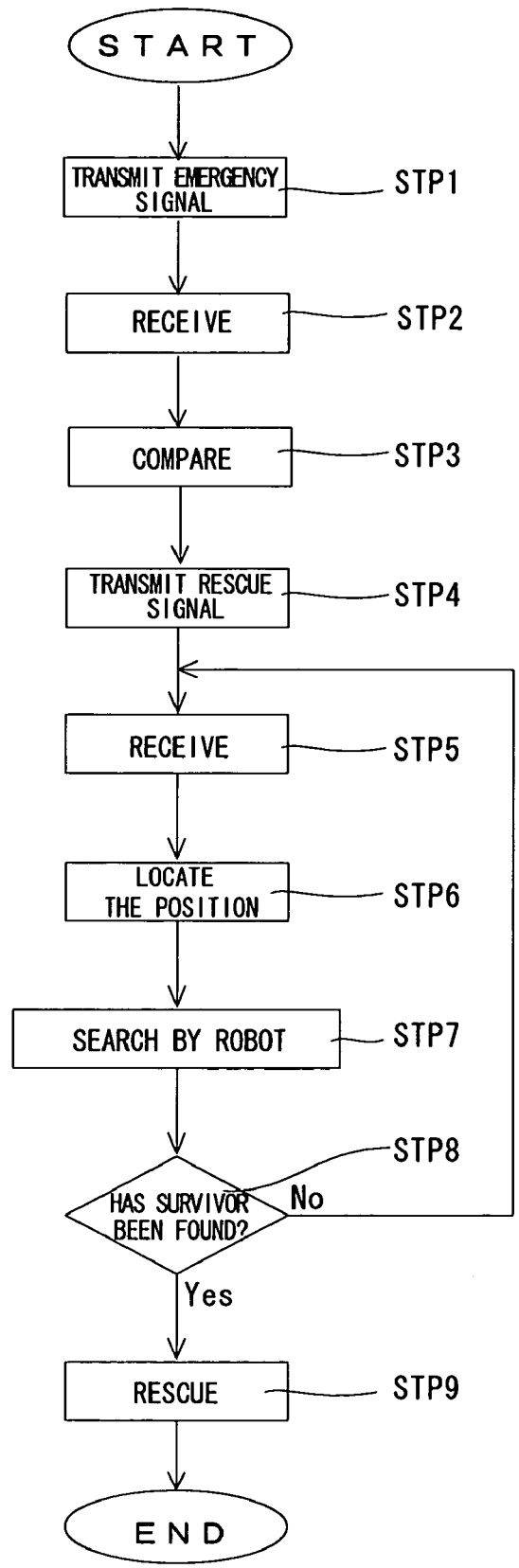
FIG. 2 is a flowchart in which a method of rescue operation using the portable telephone of FIG. 1 is shown.

FIG. 2 is a flowchart in which a method of rescue operation using the portable telephone of FIG. 1 is shown. In this method, a rescuer who has reached a collapsed site where a person is left first transmits an emergency signal toward the collapsed site using a transmission unit (STP 1). It is preferable to use high-directivity radio waves as the emergency signal. The emergency signal contains key information. The key information is kept top secret, whose contents are not open to the public.

The signal is received by the portable telephone (STP2). The received signal is sent to the first CPU 3 via the antenna 6 and the interface 5. The first CPU 3 compares the key information contained in the received signal with the key information stored in the first CPU 3 (STP3). When the received signal is an emergency signal, both pieces of the key information match. In other words, the key matching prevents misunderstanding that a signal that is not the emergency signal is the emergency signal.

After the matching of both pieces of the key information is recognized, a rescue signal is transmitted via the antenna 6 and the interface 5 (STP4). The rescue signal has a different attribute from that of signals transmitted in general speaking, website viewing, and e-mail transmission and reception. The transmission of the rescue signal is continued for a fixed time. It is desirable for the transmission of the rescue signal to use low-directivity radio waves from the viewpoint of reduction in irregular reflection. Typically, weak radio waves or low-frequency radio waves are used for the rescue signal.

A rescue party has a portable detector, with which it scans the collapsed site. The detector receives a rescue signal (STP5). The position of the portable telephone is located by the reception (STP6). The rescue party may have fixed receivers at three or more locations and so receive the rescue signal by the fixed receivers. In this case, the position of the portable telephone is determined on the principle of trilateration. For determination, a computer connected to the fixed receivers is used. The computer may be of portable type, or alternatively, may be mounted on a vehicle of the rescue party.

The rescue party commits a robot toward the determined position. The robot is relatively compact, and so can move even in narrow space. The robot may be a full-track robot, a quadrupled walking robot, or a wheel robot. The robot directs its course to strong radio waves while detecting the power of the rescue signal to approach the portable telephone. The robot may approach the portable telephone under the control of the computer of the rescue party. The robot itself may determine the position of the portable telephone while moving without the determination of the position by the detector (STP6).

The robot that has come close to the portable telephone investigates the possibility of a survivor (STP7). The investigation is performed by using a CCD camera equipped in the robot. In place of the CCD camera, or together with the CCD camera, a vital reaction sensor may be used. Concrete examples of the vital reaction sensor are an infrared sensor, a temperature sensor, a vibration sensor, and a carbon dioxide sensor.

There is a possibility that the user suffer from disaster in a position apart from the portable telephone. When no survivor is present near the portable telephone (No in STP8), a rescue signal from another portable telephone is received (STP6), so that the user of the portable telephone is searched for. When a survivor is found out near the portable telephone (Yes in STP8), the rescue party removes the rubble in the corresponding position to rescue the survivor (STP9). It is preferable to configure the robot such that it can give water to the survivor, provide space for the survivor, and allow communication between the survivor and the rescue party.

The rescue party may remove the rubble in the corresponding position without the use of the robot upon completion of determination of the position of the portable telephone (STP6).

It is preferable that the portable telephone be configured on the basis of the individual-identifying information stored in the second memory 2 such that the individual-identifying information is included in the rescue signal. Typical individual-identifying information is the number of the portable telephone. The rescue party that has received the rescue signal including the individual-identifying information can identify the user to be rescued. The identification of the user is useful for the following treatment. For example, when the user needs regular medication, medicines can be prepared in the collapsed site. When the user suffers from a chronic disease, a physician in charge can be on standby in the collapsed site.

In the portable telephone shown in FIG. 1, the first memory 1, the first CPU 3, the interface 5, and the antenna 6 are directly connected to the battery 7, as has been described. Accordingly, even if the user turns the switch 8 off before the collapse, the position of the portable telephone can be determined.

When the key information included in the rescue signal and the key information stored in the storage unit match, a sound wave (including an audible-range wave and an ultrasonic wave) may be generated from the portable telephone together with the rescue signal (or a radio wave). The rescue signal is received by a robot and also the sound wave is received by the robot. A time lag occurs between the receptions of the rescue signal and the sound wave, because the rescue signal and the sound wave are different in velocity. The distance between the robot and the portable telephone can be calculated from the time lag. Specifically, a counter circuit mounted to the robot is turned on by the reception of the rescue signal and turned off by the reception of the sound wave. The counter circuit provides the time from the reception of the rescue signal to the reception of the sound wave. The distance is calculated from the time and the difference between the rescue signal and the sound wave. When the robot has environment parameters and so corrects the velocity of sound on the basis of the environment parameters, the distance can be calculated more accurately. When three or more robots measure the distance, or one robot measures the distance in three or more locations, the position of the portable telephone can be located with great accuracy.

The portable telephone may generate light, when the key information included in the rescue signal and the key information stored in the storage unit match. The light is received by the robot. The robot may be configured to search for the portable telephone on the basis of the light.

It is also preferable that short-range radio communication be made between the rescue-signal transmitter and the portable telephone, between the portable telephone and the rescue-signal receiver, or between the portable telephone and the robot. Typical examples of the short-range radio communication are Bluetooth and infrared data communication.

When estimation of the user left under rubble is possible, a rescue signal that can be received only by the user's portable telephone may be generated. The rescue signal may be generated from a base station of the portable telephone company.

In place of the portable telephone, a PHS terminal, a PDA, and other terminals may be used to rescue survivors.

INDUSTRIAL APPLICABILITY

As described above, the mobile telephone apparatus of the present invention allows the position of a survivor to be grasped accurately and quickly. The mobile telephone apparatus is useful for rescue operation.

The invention claimed is:

1. A rescue system provided with a mobile, telephone apparatus and a robot, comprising:

a mobile telephone apparatus having a storage unit in which key information is stored; a reception unit for receiving an emergency signal including key information; a control unit for determining whether the key information stored in the storage unit and the key information included in the emergency signal match; a transmission unit for transmitting a rescue signal, wherein when the key information stored in the storage unit and the key information included in the emergency signal match, the transmission unit transmits a rescue signal; means to generate a sound wave together with the rescue signal when the key information stored in the storage unit and the key information stored in the emergency signal match; and a robot for moving close to the mobile telephone apparatus while receiving the rescue signal transmitted from the mobile telephone apparatus, wherein the robot performs the reception of the rescue signal and the reception of the sound wave; and wherein the distance between the robot and the mobile telephone apparatus is determined based on a time lag between reception of the rescue signal and reception of the sound wave by the robot.

2. The rescue system according to claim 1, wherein the robot includes means for correcting the velocity of sound on the basis of environment parameters.

* * * * *